United States Patent [19]

Calia

[11] 3,943,890

[45] Mar. 16, 1976

[54] HORSE TRAILER WASTE UNIT

[75] Inventor: Hank A. Calia, Calabasas, Calif.

[73] Assignee: The Raymond Lee Organization, Inc., New York, N.Y. ; a part interest

[22] Filed: Dec. 16, 1974

[21] Appl. No.: 533,069

[52] U.S. Cl. .................................................. 119/95
[51] Int. Cl.² ........................................ A01K 23/00
[58] Field of Search................ 119/95, 27; 296/24 C

[56] References Cited
UNITED STATES PATENTS

| | | | |
|---|---|---|---|
| 595,504 | 12/1897 | Underhill | 119/27 |
| 1,136,272 | 4/1915 | Rice et al. | 119/95 |
| 3,063,418 | 11/1962 | Hall | 119/95 |

*Primary Examiner*—Hugh R. Chamblee
*Attorney, Agent, or Firm*—Howard I. Podell

[57] ABSTRACT

A waste unit adaptable for detachable mounting to the rear door of a horse trailer for catching and containing the droppings of a horse being transported in the trailer. The unit is formed of two open containers joined by U-shaped straps that fit over the top of a trailer door to fit the device on both sides of the attached trailer door.

2 Claims, 4 Drawing Figures

U.S. Patent   March 16, 1976   3,943,890
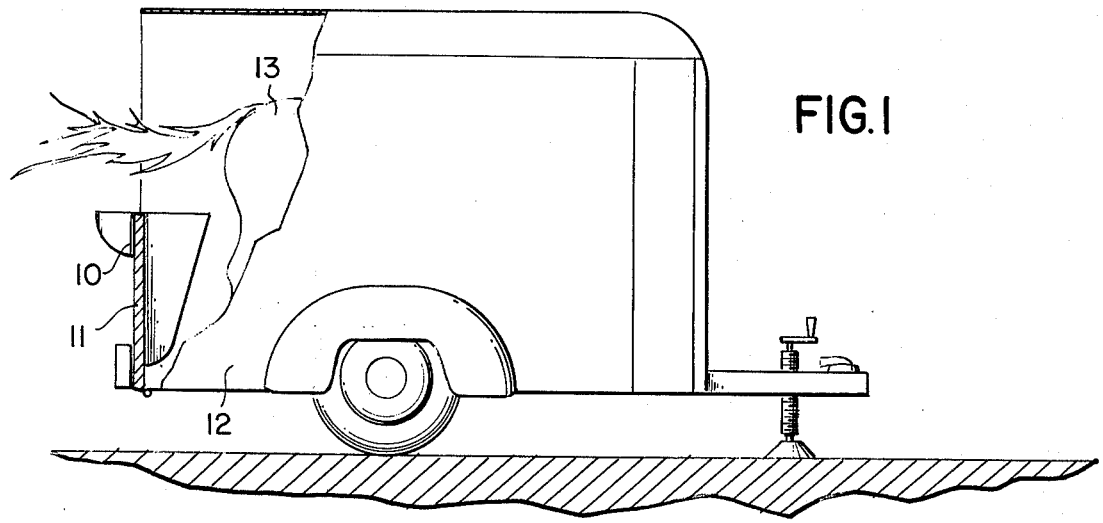
FIG. 1
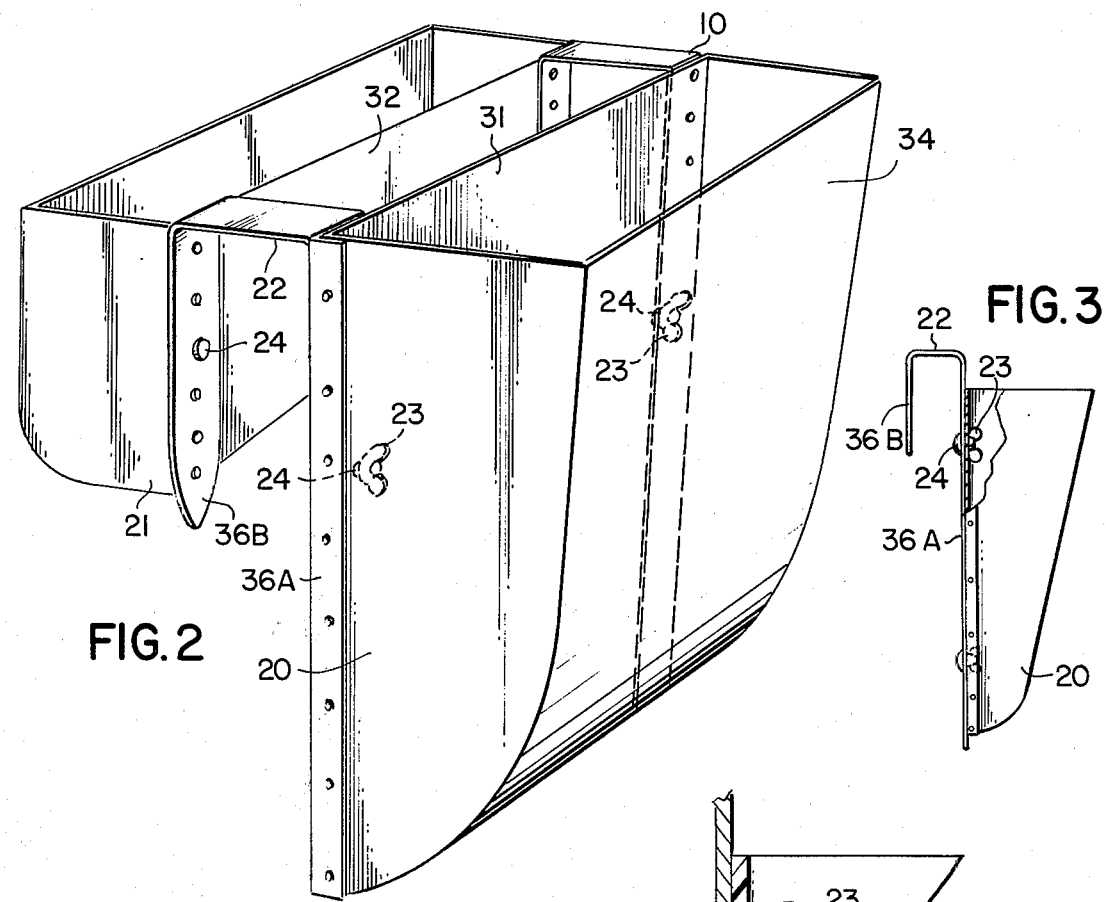
FIG. 2
FIG. 3
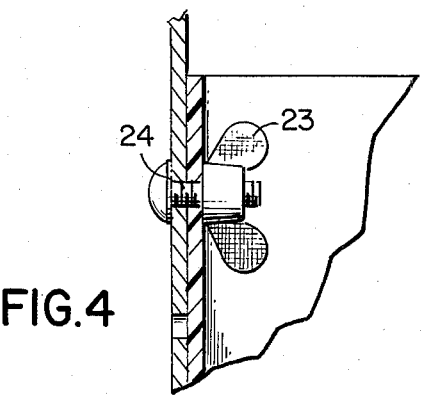
FIG. 4

HORSE TRAILER WASTE UNIT

SUMMARY OF THE INVENTION

My invention is a waste unit adaptable for detachable mounting to the rear door of a horse trailer for catching and containing the droppings of a horse being transported in the trailer. The unit is formed of two open containers joined by U-shaped straps that fit over the top of a trailer door to fit the device on both sides of the attached trailer door.

BRIEF DESCRIPTION OF THE DRAWINGS

The objects and features of the invention may be understood with reference to the following detailed description of an illustrative embodiment of the invention, taken together with the accompanying drawings in which:

FIG. 1 is a side view in elevation of the invention in use;

FIG. 2 is a perspective view of the invention;

FIG. 3 is a side view of an alternate embodiment of the invention; and

FIG. 4 is a detail side sectional view of the adjustable fastener bolt.

DESCRIPTION OF THE PREFERRED EMBODIMENT

Turning now descriptively to the drawings, in which similar reference characters denote similar elements throughout the several views, FIGS. 1, 2 and 4 show the Horse Waste Unit 10 which is hung over the top of the rear door 11 of a horse trailer 12 to keep the trailer clean while transporting a horse 13.

The waste unit 10 is in the form of a pair of open flexible plastic containers 20 and 21, each joined to a parallel leg 36A and 36B of a pair of U-shape straps 22 by thumb nuts 23 and screws 24 so that each container may be located at the desired height on the straps 22.

Both containers are formed with a flat end wall 31 and 32 that rests adjacent to an attached door side, with the opposed end wall 34 of the inside container 20 lying in a plane inclined to the flat end wall 31 so as to provide minimum interference with the rear hooves of a horse 13 in the trailer stall.

The inside container 20 and attached strap legs 36A may be deeper than the external container 21 and attached strap leg 36B.

If desired, only an inside container 20 may be mounted to the straps 22, as shown in FIG. 3.

Since obvious changes may be made in the specific embodiment of the invention described herein, such modifications being within the spirit and scope of the invention claimed, it is indicated that all matter contained herein is intended as illustrated and not as limiting in scope.

Having thus described the invention, what I claim as new and desire to secure by letters patent of the United States is:

1. An attachable waste catcher unit that may be detachably mounted over the top of the door of a horse stall of a trailer comprising
an open flexible inside container, and an open flexible outside container, each joined to parallel legs of a pair of spaced U-shaped strap members, that are shaped to fit over the top edge of a horse stall trailer door said containers being made of a plastic material whereby each container maintains a flexible opening to receive waste and said inside container has a downwardly tapered wall means.

2. The combination as recited in claim 1 in which each container is mounted by screws to the strap leg, with a plurality of mounting holes located on each strap leg to provide for independent adjustment of the height of each container to the top of the strap legs.

* * * * *